Dec. 16, 1952  M. R. DOCK  2,621,471
CHAIN REPAIR LINK
Filed March 27, 1951  2 SHEETS—SHEET 1
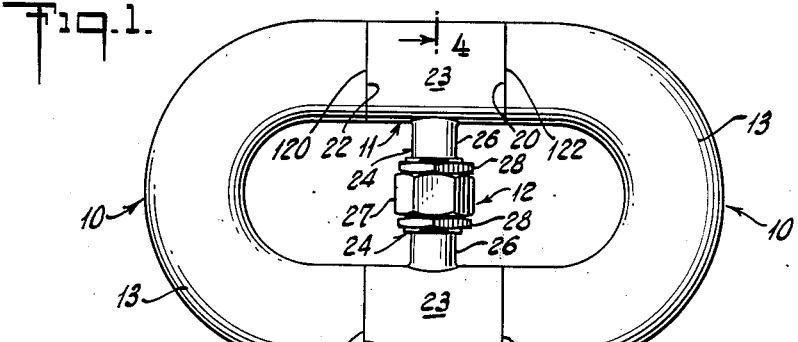
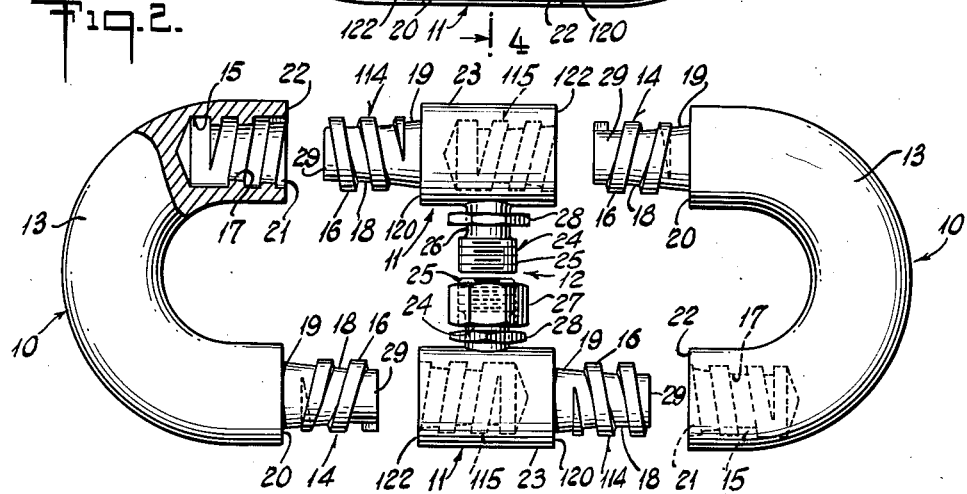
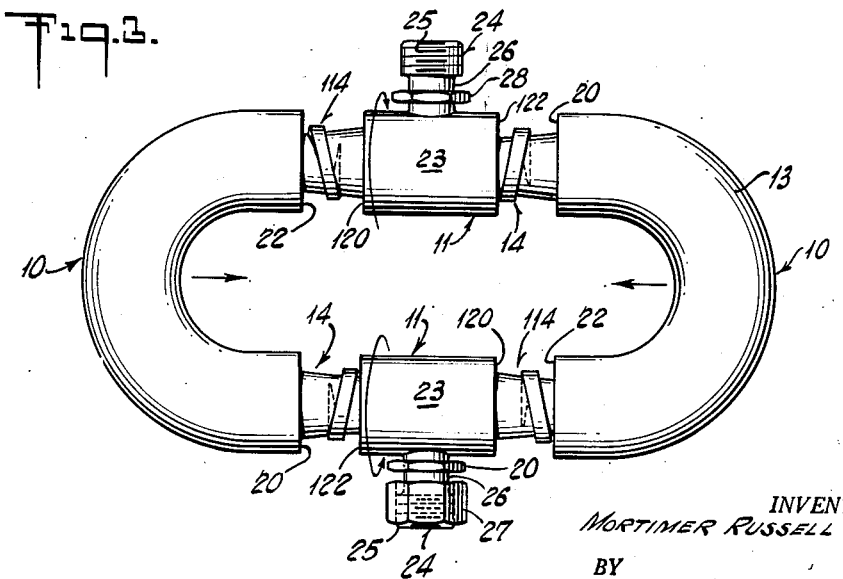
INVENTOR:
MORTIMER RUSSELL DOCK.
BY
Watson Johnson Leavenworth & Blair
ATTORNEYS.

Dec. 16, 1952  M. R. DOCK  2,621,471
CHAIN REPAIR LINK
Filed March 27, 1951  2 SHEETS—SHEET 2
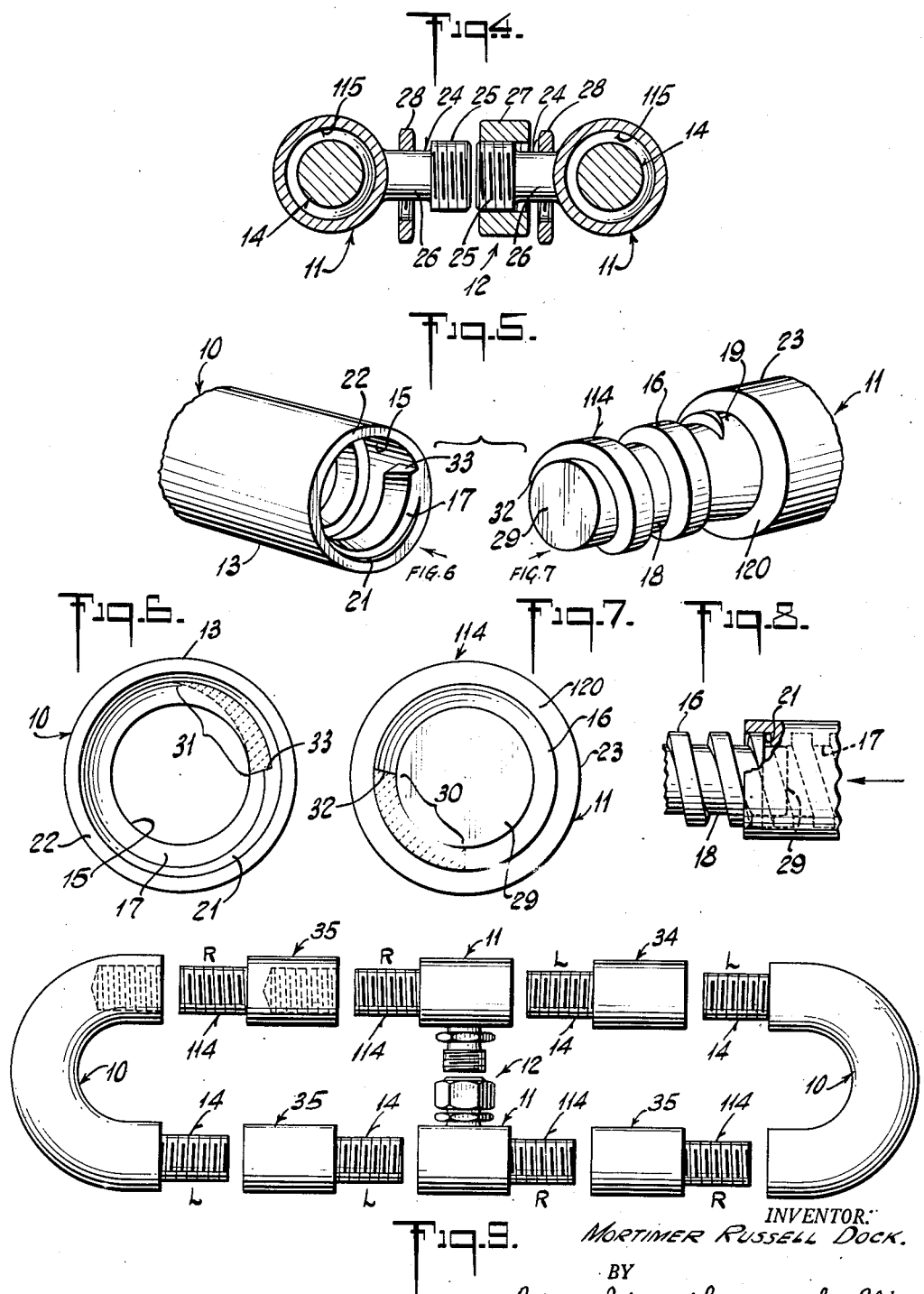
INVENTOR.
MORTIMER RUSSELL DOCK.
BY
Watson, Johnson, Leavenworth & Blair
ATTORNEYS.

Patented Dec. 16, 1952

2,621,471

UNITED STATES PATENT OFFICE 2,621,471

CHAIN REPAIR LINK

Mortimer Russell Dock, New York, N. Y.

Application March 27, 1951, Serial No. 217,744

7 Claims. (Cl. 59—85)

The present invention relates to chain shackles and, more particularly, to those of the stud link type, constituting an improvement of the subject matter of my prior United States Patent No. 2,347,088, of April 18, 1944.

A general object of the present invention is to provide such a chain shackle featured by a pair of opposed semi-elliptical end sections and a pair of opposed side sections the parts of which are readily and economically made in mass production, particularly since some may be made as substantial duplicates. The elements are so constructed as to be simply mateable without error in a rapid manner without requiring any particular skill or familiarity with the construction, and the latter is thus especially useful under trying conditions in fields of combat and the like. The parts of the preferred embodiment are so designed as to assure maximum strength with minimum likelihood in use of accidental disengagement of parts and damage thereto which might otherwise resist or prevent desired intentional disengagement for replacement of worn parts.

A more specific object of the present invention is to provide such a chain shackle structure in which all of the sections have male and female threads at opposite ends of such hand as to make side link sections interchangeably mateable with end link sections and which obviously at a glance are to be arranged for assembly in symmetrical order with all of the mouths of the female sockets opening in one direction and all of the male members extending in the opposite direction toward the latter entirely around the link.

Another object of the present invention is to equip at least some of such side link sections with stud lugs automatically alignable for connection when the threaded engagements of said end link sections with said side link sections are drawn up to intended substantial tightness.

A further object of the invention is to provide unique and simple means for connecting the stud lugs together to form a rigid stud structure the parts of which may be locked together effectively to prevent accidental loosening thereof while protecting them in use to permit intentional disengagement.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

Fig. 1 is a top plan view of an embodiment of the stud link chain shackle of the present invention with the parts thereof shown in assembled positions;

Fig. 2 is an exploded view of the structure shown in Fig. 1 and with parts in section and in unassembled positions showing relative position of parts as laid out for assembly;

Fig. 3 is a top plan view of the structure shown in Figs. 1 and 2 indicating relative position of parts as they are being assembled in a particular manner;

Fig. 4 is a sectional view, to an enlarged scale, taken substantially on line 4—4 of Fig. 1, but showing certain stud lug connecting means in initial positions prior to connecting engagement thereof;

Fig. 5 is a perspective view to an enlarged scale, with parts broken away, of interengageable male and female members constituting one of the four pairs thereof featuring the structure of Figs. 1 to 4, inclusive, but arranged obliquely with respect to each other before the necessary alignment for interengagement so as best to illustrate structural features thereof;

Fig. 6 is an enlarged elevational end view of the female member shown in Fig. 5, illustrating a certain thread removal feature thereof.

Fig. 7 is a view similar to Fig. 6 of the end of the male member of Fig. 5;

Fig. 8 is a fragmentary view, with parts in section, of a slightly modified form of interengaging male and female members which may be employed in the link structure of Figs. 1 to 7, inclusive; and Fig. 9 is a diagrammatic exploded view of the parts of a modified form of link structure of the present invention as laid out preliminary to assembly thereof and to illustrate the possible use of additional side link elements which readily may be added to the basic parts of the structure shown in Figs. 1 to 3, inclusive.

Referring to the drawings, in which like numerals identify similar parts throughout, it will be seen that a preferred embodiment of the present invention may comprise a pair of opposed semi-elliptical end sections 10, 10 and a pair of interposed side sections 11, 11, with the latter preferably tied together across the link by a transverse stud structure 12. The structional details of the various parts of that embodiment of the stud link chain shackle of the present invention are best seen in Fig. 2.

As shown in Fig. 2, each semi-elliptical end section 10 preferably is formed of round stock and comprises a main portion 13 provided on one end with a male member 14 and in the other end with a female socket 15, with the axes of the male member and female socket being arranged substantially parallel to each other. The male member 14 is suitably provided with a helical or spiralled thread 16 of any desired form, either right-handed or left-handed, and the female socket 15 is provided with an internal helical or spiralled thread 17. Although V-shaped threads may be used, the square threads shown are preferred for purposes of strength, and although single entry threads are indicated, plural entry threads may be employed if it is desired to speed assembly operations. With respect to the selected hand for the male and female threads of an end section 10, those threads are opposite in hand. For example, if the male thread 16 is left-handed as shown, the female thread 17 is right-handed. The spindle, shank or core 18 of male member 14 may be tapered, but preferably is substantially cylindrical for a major portion of its length but with the threads being run out at the male member base 19 to increase the diameter thereof for purposes of strength. The base 19 of male member core 18 connects with the major portion 13 at a stop shoulder or abutment 20. The female socket 15 is made complementary in shape to a male member like male member 14 except that the threads thereof are opposite in hand, with its mouth 21 flared for fit to the tapered base 19 of such male member. End edge 22 of the end section major portion 13 circumambient of the mouth 21 of female socket 15 also forms a stop shoulder or abutment, as will be more fully explained hereinafter.

Each side section 11 comprises a major portion 23 of cylindrical stock preferably of a diameter substantially that of the major portion 13 of each end section 10. One end of the major portion 23 of side section 11 is provided with an externally-threaded male member 114 like, in all respects, the male member 14 of each end section 10, except that the threads thereof are opposite in hand, having at its base a similar stop shoulder or abutment 120. In the other end of major portion 23 of side section 11 is provided an internally-threaded female socket 115 like, in all respects, female socket 15 of end section 10 except that the threads thereof are opposite in hand, with the end edge 122 circumambient of its mouth 21 providing a stop shoulder or abutment similar to 22. It will thus be seen that the male members 14, 14 of end sections 10, 10, and male members 114, 114 of side sections 11, 11, are respectively mateable with female sockets 115, 115 of the side sections and the female sockets 15, 15 of the end sections.

It is to be understood that features of the present invention may characterize certain chain shackle structures consisting only of end sections and side sections without the employment of stud structure 12. However, in the preferred embodiment, stud structure, such as that illustrated in the drawings, is emploed, and reference thereto will best illustrate the lay-out of the link sections prior to their threaded assembly and their manipulation relative to each other during threaded assembly. Thus, it will be noted from Figs. 2 and 3 that each side section 11 preferably has mounted to the side of major portion 23 and extending normal thereto, a stud lug 24, preferably provided with an enlarged externally-threaded head 25 at its outer end connected to the side link section by a reduced unthreaded shank 26. An internally-threaded connecting sleeve 27 is threadably engaged on one of the externally-threaded enlarged stud lug heads 25 and preferably is of a length appreciably shorter than the combined lengths of the two externally-threaded enlarged heads 25, 25, as shown in Fig. 1, when properly aligned in opposed relation as shown in Fig. 4. It will readily be seen that by providing the external male threads of the enlarged stud lug heads 25, 25 of the same hand, the mating internally-threaded sleeve 27 may be run partially off of one onto the end of the other when in opposed relation. On each stud lug shank 26 is loosely mounted an internally-threaded lock nut 28 adapted to be threadably engaged on the externally-threaded enlarged head 25 and juxtaposed to an adjacent end of the connecting sleeve 27 when medially arranged as indicated in Fig. 1 to be jammed thereagainst for the purpose of locking. It will be noted from Fig. 1 that the connecting sleeve 27 and the lock nuts 28, 28 jammed against opposed ends thereof normally substantially cover the external threads of the enlarged heads 25, 25 for protective purposes.

In order to assemble a stud link chain shackle of the structure shown in Figs. 1, 2 and 3, a pair of semi-elliptical end sections 10, 10 will be laid out, preferably on a flat surface, with a male member 14 opposed to and spaced appreciably from a female socket 15 of the other in substantial alignment. A pair of side link sections 11, 11 will then be interposed therebetween with the enlarged head 25 of the stud lug 24 of one carrying connecting sleeve 27 run back thereon, all as illustrated in Fig. 2. The male members 114, 114 of the side link sections 11, 11 and the female sockets 115, 115 thereof naturally will be respectively substantially aligned with the female sockets 15, 15 and the male members 14, 14 of the end sections. The opposed end sections 10, 10 are then pushed toward each other to engage all of the male members into all of the female sockets. Then the side sections 11, 11 are rotated about their axes in opposite directions so as to draw up the threads of the male members into the threads of the female members. Thus, as indicated in Fig. 3, with the male members 14, 14 of the end sections 10, 10 being provided with left-handed threads mateable in the female sockets 115, 115 of side sections 11, 11, and with the male members 114, 114 of the latter provided with right-handed threads mateable with the female sockets 15, 15 of the end sections, rotation of the side sections in opposite directions, for example, clockwise for the upper side section and counter-clockwise for the lower side section as viewed in Fig. 3, the male members will be threaded into the female sockets to draw the end sections toward each other.

Eventually such threaded engagement of parts will bring the abutment shoulders 20, 20 of the end sections 10, 10 and the abutment shoulders 120, 120 of the side sections 11, 11 respectively tightly up against the abutment edges 122, 122 of the side sections and 22, 22 of the end sections. If abutment shoulders and edges are carefully located axially of the sections so that as the abutment shoulders and edges are so drawn up tightly together, the stud lugs 24, 24 will be brought to alignment in opposed relation as indicated in Figs. 1 and 4, so that connecting sleeve 27 may be run partially off of the externally-threaded enlarged stud lug head 25 carrying it onto an outer portion of the other enlarged stud lug head 25, and when medially arranged thereon will expose at its opposite ends portions of those external male threads to receive lock nuts 28, 28, all as illustrated in Fig. 1. Substantial coverage of the external threads of the enlarged heads 25, 25 of stud lugs 24, 24 by connecting sleeve 27 and lock nuts 28, 28 protects them from damage by handling equipment, such as wildcats, and by contact with other chain links during handling or storage in chain lockers. Thus, disassembly of parts is readily permitted for separating sections of chain when desired, or to permit replacement of worn parts of links of the present invention.

As might be noted from Fig. 2, but as best seen in Figs. 5, 6 and 7, a portion of the male thread 16 at the tip 29 of each male member 14 or 114 is removed or cut away. Such removed portion is clearly indicated in Fig. 7 by the dot-hatched area 30. Similarly, a portion of the end of the female thread 17 at the mouth 21 of female socket 15 or 115 is removed as indicated by the dot-hatched area 31 of Fig. 6. Such thread portion removal facilitates initial interengagement since the end 32 of male thread 16 will slip past the end 33 of female thread 17 to permit tip 29 to slide an appreciable distance into the mouth 21, thereby facilitating interengagement before relative thread-engaging rotation. In Fig. 8, thread removal at the tip 29 of male core 13 and in the mouth 21 of its mateable female socket is exaggerated to an extent providing a thread-free cylindrical core tip and a core-receptive thread-free cylindrical counterbore at the socket mouth. The Fig. 8 feature permits appreciable socketing prior to rotational thread engagement without necessity of careful orientation as might be necessary with less thread removal as in the case of Figs. 5, 6 and 7. However, the lesser extent of thread removal illustrated in Figs. 5, 6 and 7 is sufficient for the purposes of chain shackles of the stud link types, such as those illustrated in Figs. 1 to 4, inclusive, due to the fact that lay-out of the link parts as proposed in Fig. 2 includes juxtaposition in opposition of the stud lugs 24, 24 which automatically dictates the relative orientation which permits the end 32 of male thread 16 to slide past the end 33 of female thread 17 of any mateable pair. If, however, the invention is to be practiced with chain shackles not equipped with such transverse stud structure, the exaggerated thread removal of Fig. 8 may be preferred since, in such case, structures of link parts do not so readily provide guiding orientation.

It will be understood from Fig. 9 that the basic parts of the stud link chain shackle of Figs. 1 to 4, inclusive, may be utilized to advantage with additional elements for construction of links of different dimensions. For example, with the pair of semi-elliptical end sections 10, 10 and the pair of stud lug-equipped side sections 11, 11, additional side section inserts 34, 34 and 35, 35 may be employed, each arranged between mateable ends of end sections and stud lug-equipped side sections. In such case, it is to be understood that one pair of such insert sections 34, 34 is similar to side sections 11, 11 (with, of course, the omission of stud lugs 24, 24), but with the threads of the male members and female sockets thereof being opposite in hand, while the other pair of insert side sections 35, 35 may be substantial duplicates of those side sections (except for omission of the stud lugs) with the threads of their male members and female sockets of like hand. Thus, the male member 14 of each end section 10 may carry a left-handed thread with the thread of the female socket of side insert 34 opposed thereto being mateable therewith, and with its male member 14 also provided with a left-handed thread. In such case, the female socket of each side section 11 will have an internal thread mateable with the threads of the male members of either the end section 10 or the insert section 34 interposed therebetween. With the male member 114 of side section 11 provided with a right-handed thread, the internal thread of its receptive socket in insert section 35 will be mateable therewith, and the external thread of the male member 114 of the latter will also be right-handed for mating with the internally-threaded socket 15 of the other end section. In order to assemble the parts of an extended link structure, such as that proposed in Fig. 9, it will be understood that the insert sections may first be threadably mounted to any of the mating juxtaposed threaded ends of the basic link sections and the resultant composite parts, or section units comprising assembled elements then finally assembled as in the manner previously described. It is to be noted that the insert sections may be varied in shape and length as may be desired, or more thereof may be employed to construct links of still longer dimensions.

Attention is called to the fact that in laying out the basic parts of a link of the present invention, such as proposed in Fig. 2, they are arranged in symmetrical order with all the mouths of the female sockets opening in one direction and all of the male members extending in the opposite direction toward the latter entirely around the link in the same direction so as to simplify for one unfamiliar with such link structure the assembly operations. It is obvious to anyone that male members must be opposed to female sockets and when this is accomplished, they are automatically mateable, thereby eliminating trial and error procedure, which may be extremely important under trying conditions, particularly in the field under combat conditions. Further, it will be noted that the end sections are duplicates of each other and that the side sections are duplicates of each other, thereby minimizing cost of production. Also, the structural characteristics of the parts of such chain shackles readily make possible practice of a variety of types of manufacturing procedure. For example, although the sockets and threads readily can be formed by suitable heavy-duty drilling and cutting machines, it is possible, particularly where threads of large dimension and relative steep pitch are employed, and especially with respect to square threads, casting and drop forging advantageously may be used for production of parts. Since heavy-duty chain is normally made from wrought iron, steel or alloys thereof, of course the stud lug elements may, if desired, be formed separately and welded to the sides of the side sections. In the event that strength demands dictate use of certain strength contributing features, such as square threads and increased sections at the bases of the male cores, it has been found also to be advantageous to form each male member of an O. D. of about two-thirds or more of the O. D. of the link structure on which it is formed.

It will thus be seen that the objects set forth above, among those made apparent from the preceding description are efficiently attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A chain shackle comprising, in combination; a pair of integral, rigid, C-shaped end sections each having a female threaded socket in one end thereof and a male threaded member extending from the other end thereof; and a pair of integral, rigid, side link sections each having a male threaded member extending from one end thereof and a female threaded socket in the other end thereof; each of said side sections being interposable between opposed female and male ends of said end sections with the threads of its male member and female socket respectively complementary with the threads of the opposed female and male ends of said end sections, the threads of said end section male members being like and the threads of said side section male members being like but opposite in hand to the former, the threads at the tip of each male member and in the mouth of each female socket being each terminated in an axially extending portion located in a predetermined radial position to dictate similar orientation of opposed like parts and to permit sliding reception of each male member into its complementary female socket, thereby facilitating simultaneous initial interengagement of all four threaded pairs, whereby said shackle may be assembled and disassembled solely by simultaneous rotation in opposite directions of said side sections.

2. The chain shackle as defined in claim 1, characterized by the provision of said male and female members with substantially large dimension and steep pitch threads each extending no more than about two full turns.

3. The chain shackle as defined in claim 1 characterized by the provision of a pair of opposable stud lugs each extending from one side of each of said side sections and adapted to be held together to form a cross stud, said mating male and female threads having their engaging entry ends oriented relative to each other to cause said stud lugs to be aligned for securement against relative rotation when the four sections are drawn up relatively tightly together to form a stud link.

4. The stud link as defined in claim 3 characterized by the provision of externally-threaded enlarged cylindrical heads on the outer ends of said lugs to be juxtaposed with threads thereof being of the same hand whereby the thread of one may form a continuation of the thread of the other when axially aligned, said lugs having reduced-section unthreaded shanks inward of said heads, an internally threaded sleeve threadably receptive of both of said lug heads to connect them together with portions of the male threads exposed at both ends of said sleeve, and a pair of lock nuts with one located on each of said unthreaded shanks adapted to engage and substantially cover the otherwise exposed portion of the male thread adjacent thereto.

5. A chain shackle of the stud link type comprising, in combination; a pair of substantially like, rigid, C-shaped end sections each having an internally-threaded socket in one end thereof and an externally-threaded male member extending from the other end thereof substantially parallel to said socket with the male threads like and the female threads being like but opposite in hand to the male threads; a pair of substantially like, rigid, side link sections each having a male member extending from one end thereof and carrying a male thread complementary to the female thread of either of said sockets and threadably engaged in one of said sockets, each of said side link sections having a socket in the other end thereof provided with a female thread complementary to the male thread of either of said end section male members and threadably receiving one of the latter; each of the tips of each male thread at the end of each male member and of each female thread in the mouth of each socket being terminated in a foreshortened end portion located in a predetermined radial position which dictates similar orientation of opposed like sections and permits limited socketing without relative rotation for facilitating initial sliding reception of each male member into its complementary female socket and simultaneous initial inter-engagement of all four threaded pairs of male members and female sockets, whereby said shackle sections may be assembled together solely by simultaneous rotation in opposite directions of said side link sections; and a pair of opposed stud lugs each extending from one side of each of said side sections toward the other side section and temporarily held to the stud lug of the latter to prevent unintended reverse rotation of said side link sections and attendant undesired disassembly of shackle sections.

6. The stud link as defined in claim 5 characterized by the provision of externally-threaded enlarged cylindrical heads on the outer juxtaposed lug ends with threads thereof being of the same hand whereby the thread of one forms a continuation of the thread of the other, said lugs having reduced-section unthreaded shanks inward of said heads, said internally-threaded sleeve exposing portions of the male threads at both ends thereof, and a pair of lock nuts engaging and substantially covering the otherwise exposed portions of the male thread adjacent the ends of said sleeve.

7. A chain shackle of the stud link type comprising, in combination; a pair of opposed, substantially like, similarly square-threaded, rigid, C-shaped end sections each having a male threaded end and a female threaded socket end with the female threads opposite in hand to the male threads; a pair of substantially like, similarly square-threaded, rigid, side link sections each having a male threaded end complementary to the female threaded socket of either of said end sections and a female threaded socket end complementary to the male threaded end of the other of said end sections, the mouth of each of said sockets and the core of each of said male ends at its base being complementally flared and run out, the threads of the sockets and male members terminating short respectively of the mouths and tips thereof each in an axially-extending portion located in a predetermined radial position to dictate similar orientation of opposed like parts and to permit limited sliding reception of each male member into its complementary female socket to facilitate initial interengagement; stop structure at the socket mouths and male end bases for mutual abutment to stop relative rotation in threading them home located axially with respect to the threads as to cause opposed points on the sides of said side sections to be oriented directly opposite each other with the mating threads drawn up relatively tightly; a pair of aligned opposed stud lugs each fixed to one side section at its mentioned point and having externally-threaded enlarged juxtaposed heads with the threads thereof of like hand; and means threadably engaged on both of said stud lugs temporarily to hold them together in opposed relation to prevent unintended back-off rotation of said side link sections and attendant undesired disassembly of shackle sections.

MORTIMER RUSSELL DOCK.

REFERENCES CITED

The following references are of record in the file of this patent:

UNITED STATES PATENTS

| Number | Name | Date |
| --- | --- | --- |
| 1,454,335 | Prendergast | May 8, 1923 |
| 2,347,088 | Dock | Apr. 18, 1944 |